United States Patent

Kratt, III et al.

[11] Patent Number: 5,329,414
[45] Date of Patent: Jul. 12, 1994

[54] PROTECTIVE RELAY INTERFACE

[75] Inventors: Edward J. Kratt, III, Montville; David H. Quam, Stanhope, both of N.J.

[73] Assignee: RFL Electronics Inc., Boonton, N.J.

[21] Appl. No.: 846,868

[22] Filed: Mar. 6, 1992

[51] Int. Cl.⁵ ............................................. H02H 3/00
[52] U.S. Cl. ...................................... 361/64; 361/68; 361/38
[58] Field of Search .................... 361/64, 68, 83, 38

[56] References Cited

U.S. PATENT DOCUMENTS 4,939,617 7/1990 Hoffman et al. ..................... 361/64
5,150,270 9/1992 Ernst et al. ............................ 361/64

Primary Examiner—A. D. Pellinen
Assistant Examiner—S. Jackson
Attorney, Agent, or Firm—Martin M. Novack

[57] ABSTRACT

A protective relay communication interface includes a transformer having primary windings arranged as, at least two, sets of opposed windings. The interface is connected to a local relay sensing a current at that point on a power line to be protected. The interface is also connected to a communication link to a remote relay sensing the current at a remote position on the power line. It is by this communication link that signals representative of the sensed currents are transmitted from each relay to the other. A local signal from the local relay is passed through part of, but not all of, the primary windings inducing a corresponding signal in the secondary windings of the transformer which is transmitted to the remote relay via the communications link. A received remote signal from the remote relay is passed via at least two mutually opposed sets of the primary windings to the local relay. Because the windings are opposed, the fluxes produced cancel inducing no net current in the secondary windings of the transformer, hence preventing feedback.

5 Claims, 4 Drawing Sheets

PROTECTIVE RELAY INTERFACE

FIELD OF THE INVENTION

This invention relates to a protective relay communication interface to interface a local relay to a communication link with a remote relay.

BACKGROUND OF THE INVENTION

AC power transmission lines are often protected by protective relay systems which trip circuit breakers to isolate a section of the lines if a fault is detected. The systems comprise local and remote terminals linked, via communication interfaces, by a communication channel along which information about the current, for example, is transmitted between the terminals. When this information indicates that a fault has occurred, the terminals trip the circuit breakers to isolate the line.

In the past, communication has taken place via two wires called pilot wires. It is now necessary to replace such wires by a four wire high speed digital channel communication system, but in doing this a problem has been encountered with the feedback of a received signal to the transmitting relay. It is an object of this invention to provide an interface in which such feedback is substantially reduced or eliminated.

SUMMARY OF THE INVENTION

According to the invention there is provided a protective relay communication interface to interface a local relay to a communication linked relay, which interface comprises a communication input for connection to the communication link and by means of which a remote signal indicative of the current sensed at the remote relay is input to the interface; a communication output for connection to the communication link and by means of which a local signal representative of the current sensed at the local relay is output from the interface to the communication link; a local relay port for connection of a local relay to the interface and by means of which remote signals are output to the local relay and local signals are input to the interface from the local relay; an output transformer comprising primary windings formed from at least two sets of mutually opposed windings, and secondary windings connected to said communication output; a first signal path formed, at least in part, by some of said sets of primary windings such that a local signal is coupled to said secondary windings; and a second signal path between said communication input and local relay port formed, at least in part, by said sets of mutually opposed windings such that at least two mutually cancelling fields of flux are induced by the remote signal which induce substantially no current in said secondary windings.

Feedback of the received remote signal is thus substantially reduced or eliminated since no current is induced by it in the secondary windings.

Further features and advantages of the invention will become more readily apparent from the following detailed description when taken in conjunction with the accompanying drawings.

DESCRIPTION OF THE PREFERRED EMBODIMENT

Figure 1:
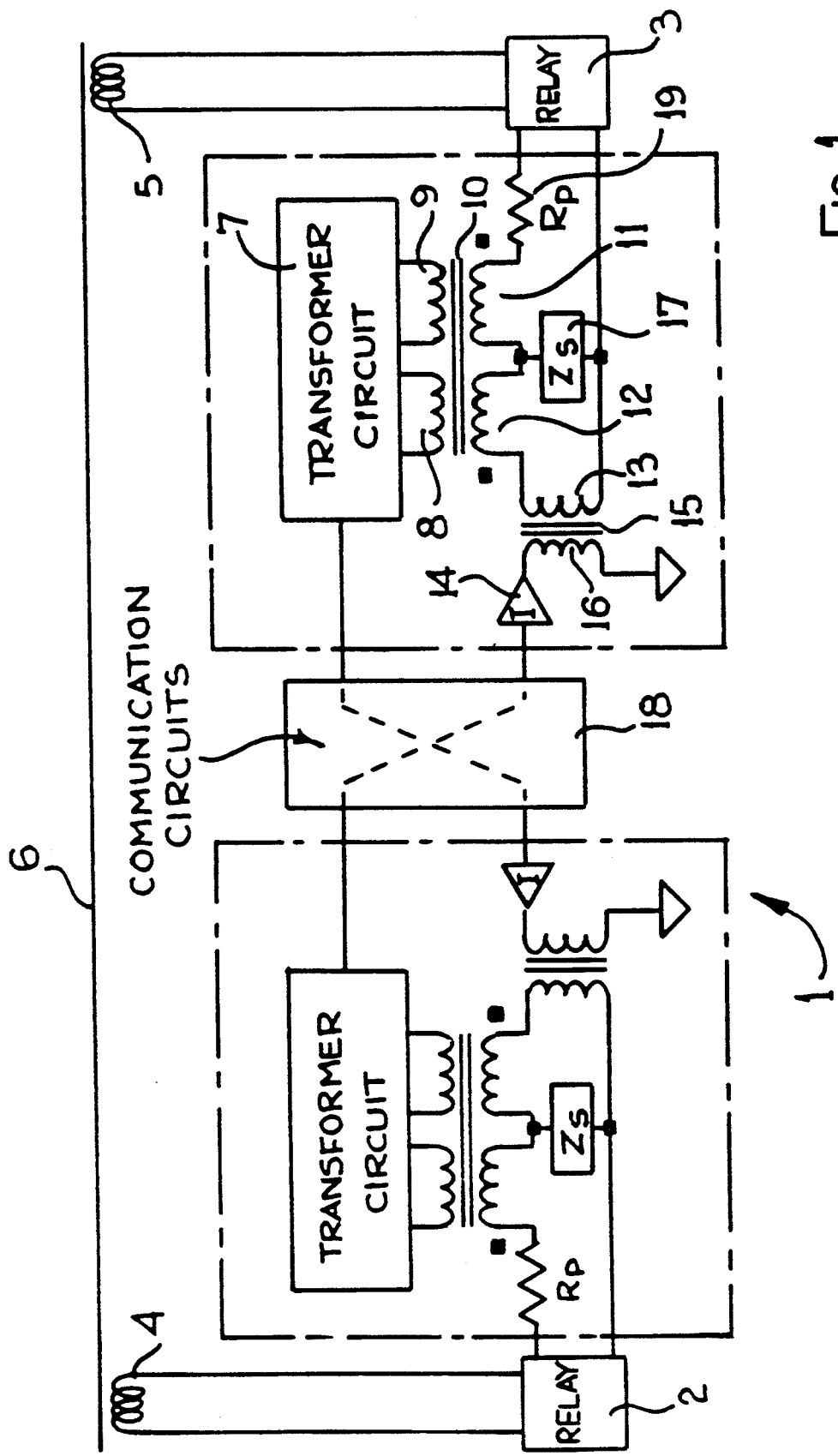
FIG. 1 shows a protective relay system incorporating two relay interfaces in accordance with the invention.

FIG. 1 shows a pair of protective relay communication interfaces in accordance with the invention incorporated into a protective relay system 1 comprising a local relay 2 and a remote relay 3 linked via communication circuits 18. Each of the relays senses, by means of sensing coils 4 and 5, the current flowing through a section of a powerline 6.

Associated with each relay is an interface, shown in broken outline, comprising an active transformer circuit 7 having secondary windings 8 and 9 inductively coupled via cores 10 to primary windings 11 and 12. The communication circuits 18 provide a digital communication link between the local and remote relays replacing a pilot wire link. The transformer circuit may be of the type disclosed in U.S. patent application Ser. No. 662,728, filed Mar. 1, 1991, now U.S. Pat. No. 5,150,270, and assigned to the same assignee as the present Application. As disclosed therein, signals received from a sense winding and a feedback winding are converted to an output voltage, which is the illustrated output of transformer circuit 7. The communication circuits 18 can include conventional analog-to-digital and digital-to-analog converter circuits, as is known in the art. The relays are the existing relays and it is necessary for the interfaces to emulate the pilot wires impedance characteristics if the relays are to function correctly. A further winding 13 is inductively coupled to a high power amplifier 14 via a core 15 and winding 16.

The high power current amplifier circuit 14 amplifies the signal received via the communication circuits 18 from the other remote relay unit. The interface has an impedance 17 of value Zs and the winding 12 senses the primary transfer current flowing to this circuit while winding 11 senses the primary transformer current flowing away from this circuit.

In this embodiment, the relay 3 is a relay for use with pilot wires having zero resistance. It is necessary for the interface to match the resistance of the replaced pilot wires and therefore resistance 19 $R_p$ is made zero.

Winding 12 has $N_1$ turns and winding 11 has $N_2$ turns, and for this case ($R_p=0$) the ratio of $N_1:N_2$ is 1:2. The windings are opposed, that is to say, they are wound in different directions and connected such that a current travels clockwise through one winding and anticlockwise through the other.

Figure 2:
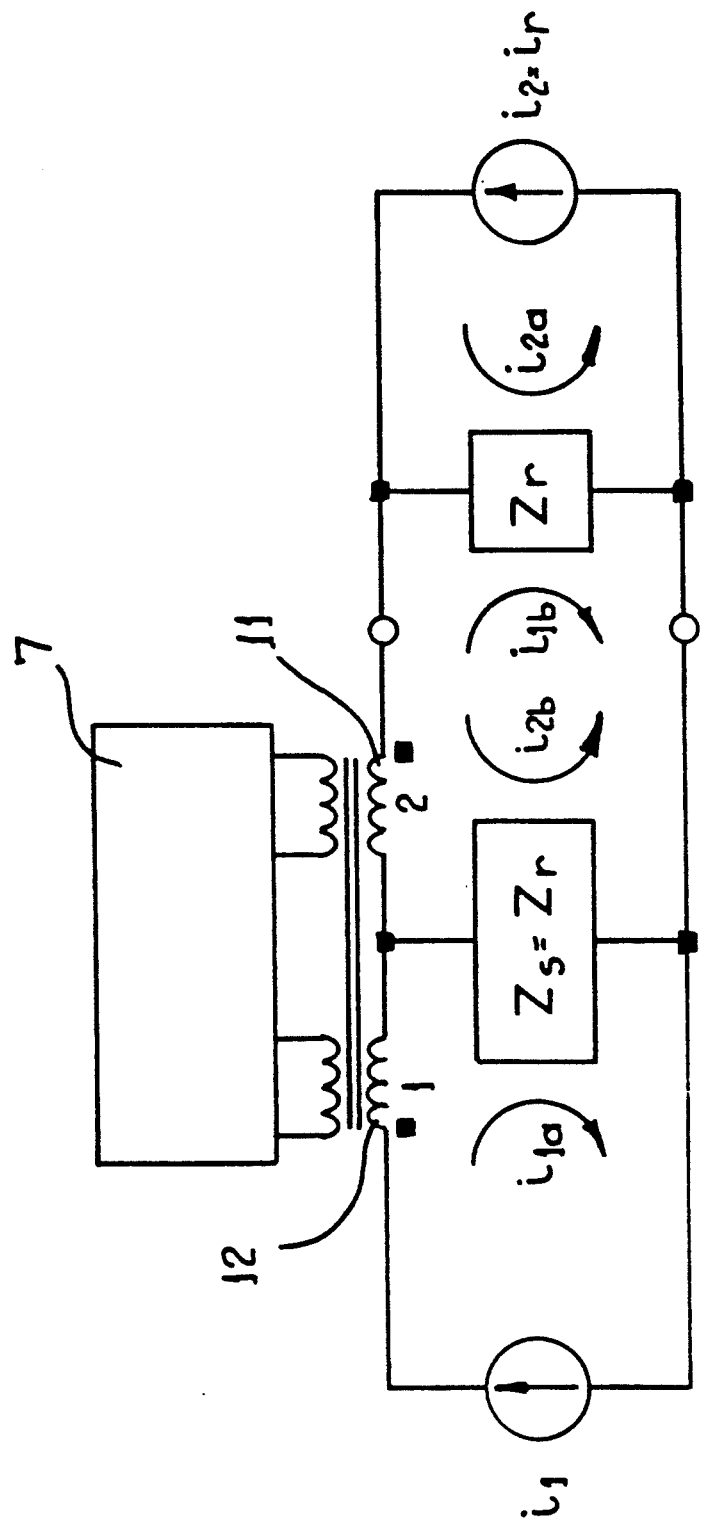
FIGS. 2 to 4 show Norton's equivalent circuits of embodiments of relay interfaces in accordance with the invention.

The equivalent circuit of one relay and interface is shown in FIG. 2. The relay is shown as a current source $i_2$ and an impedance $Z_r$. The current amplifier is shown as a current source $i_1$ and an impedance $Z_s$, where impedance $Z_s$ equals impedance $Z_r$.

Considering current source $i_1$ first, because $Z_x=Z_r$, half the current $i_1$ (i.e. $i_{1a}$) flows through the source impedance $Z_s$, and half the current $i_1$ (i.e. $i_{1b}$) flows through the relay impedance $Z_r$. The current flowing through winding 12 is $i_{1a}+i_{1b}$ while the current flowing through winding 11 is $i_{1b}$, that is to say the current flowing through winding 12 is twice that flowing through winding 11. However, because the winding 11 has twice as many turns as winding 12, the magnetic flux produced by the windings are equal. Moreover, because the windings are opposed, the flux produced by winding 11 is equal and opposite to that produced by winding 12 and no net flux change is experienced by the transformer circuit 7. Hence, none of the received remote current is transmitted back to the remote relay that sends it.

Considering current $i_2$ generated by the local relay and representative of the sensed or local current, this current splits into two equal currents $i_{2a}$ and $i_{2b}$. Current $i_{2a}$ flows through $Z_r$ and current $i_{2b}$ flows through $Z_s$ via winding 11. None of the sensed current flows through winding 12 and the flux change produced by the current $i_{2b}$ through the winding 11 is detected by the transformer circuit 7 and transmitted to the remote relay by the communications circuit 18.

Figure 3:
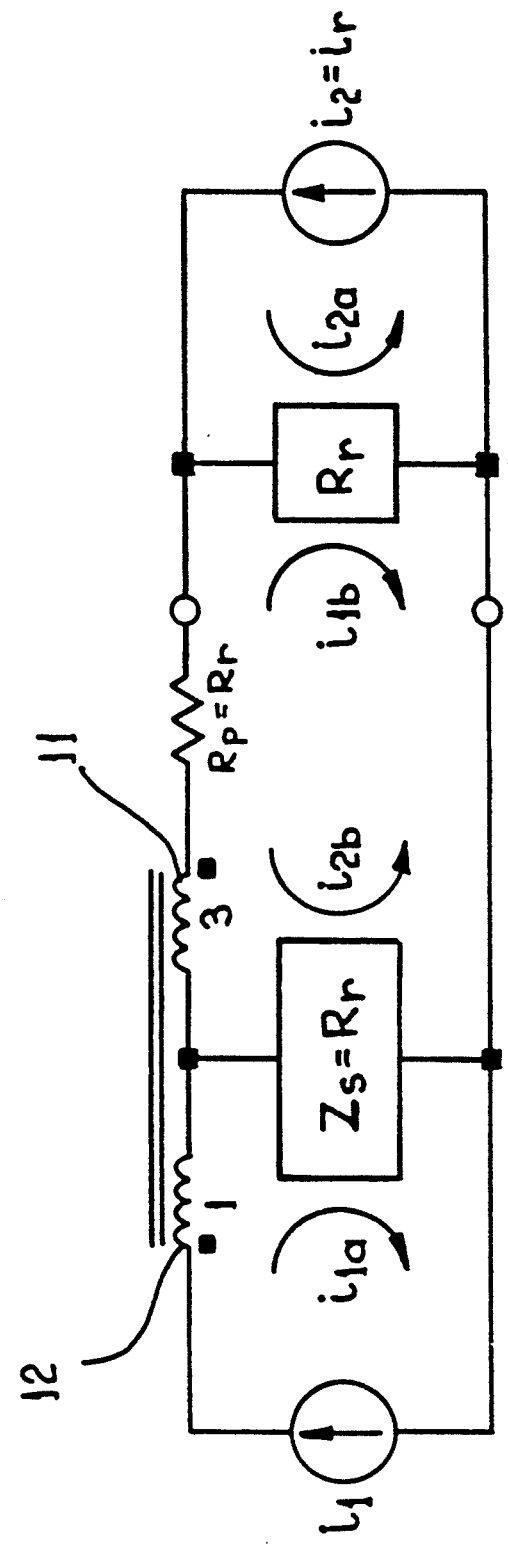

An equivalent circuit for a similar embodiment is shown in FIG. 3 for interfacing a type of relay which is purely resistive. Resistance $R_p$ and impedance $Z_s$ are each made equal to $R_r$, the relay resistance. In this case, a received current $i_1$ splits into two unequal currents $i_{1a}$ flowing through $Z_s$, and $i_{1b}$ flowing through $R_r$. Since $Z_s$ is $\frac{1}{2}$ the resistance of $R_p$ and $R_r$ combined, $\frac{2}{3}$ of the current flows through $Z_s$ and $\frac{1}{3}$ through $R_r$. The winding 12 has the full current $i_1$ flowing through it while the current flowing through winding 11 is only $\frac{1}{3}$ $i_1$. To compensate for this, the windings have a ratio of 1:3, that is to say, winding 11 has 3 times the number of turns of winding 12. The net flux change is therefore zero since the windings are opposed and no feedback occurs.

Considering the current $i_2$ produced by the relay and representative of the sensed current, this splits into $i_{2a}$ flowing through the resistance $R_r$, and $i_{2b}$ flowing through resistance $R_p$, the winding 11 and Z. Current i is thus passed via the transformer circuit 7 to the communications circuit 18 and transmitted to the remote relay.

Figure 4:
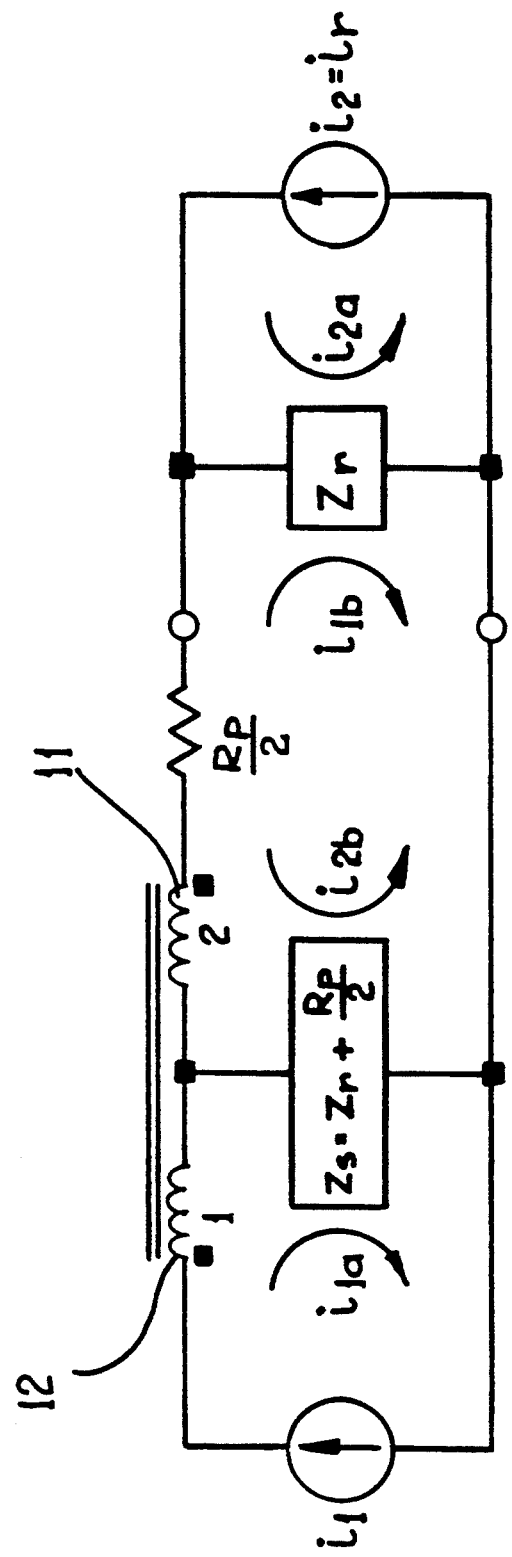

FIG. 4 shows the equivalent circuit of a further embodiment for interfacing a relay having an impedance $Z_r$ and a resistance $R_p/2$. Impedance $Z_s$ is made equal to $Z_r + R_p/2$ and therefore the received current $i_1$ splits into two equal currents $i_{1a}$ flowing through $Z_s$ and $i_{1b}$ flowing through $R_p/2$ and $Z_r$. Winding 12 thus has the full current $i_1$ flowing through it, whereas winding 11 only has half that current flowing through it. To eliminate feedback, the turns ratio is 1:2, that is to say, winding 11 has twice the number of turns as winding 12. The current sensed by the local relay is passed via winding 11 in a similar manner to the earlier described embodiments.

We claim:

1. A protective relay communication interface to interface a local relay to a communication link with a remote relay, which interface comprises:
   a communication input for connection to the communication link and by means of which a remote signal indicative of the current sensed at the remote relay is input to the interface;
   a communication output for connection to the communication link and by means of which a local signal representative of the current sensed at the local relay is output from the interface to the communication link;
   a local relay port for connection of a local relay to the interface and by means of which remote signals are output to the local relay and local signals are input to the interface from the local relay;
   an output transformer comprising primary windings formed from at least two sets of mutually opposed windings;. and secondary windings connected to said communication output;
   a first signal path formed, at least in part, by some of said sets of primary windings such that a local signal is coupled to said secondary windings; and
   a second signal path between said communication input and local relay port formed, at least in part, by said sets of mutually opposed windings such that at least two mutually cancelling fields of flux are induced by the remote signal which induce substantially no current in said secondary windings.

2. A protective relay system comprising a local relay and a first associated interface as claimed in claim 1.

3. A protective relay system as claimed in claim 2 further comprising a first communications link connected to said communication input of said interface.

4. A protective relay system as claimed in claim 3 further comprising a remote relay and second associated interface and second communication link connected to first communication link such that currents sensed by each relay can be transmitted to the other relay.

5. A method of interfacing relays linked by a communication link to prevent feedback comprising:
   inputting a local signal representative of the current sensed by a local relay into an interface;
   outputting said local signal from said interface by passing said signal through part of primary windings of a transformer, to induce a corresponding signal in secondary windings of the transformer;
   transmitting said corresponding signal via a communication link to a remote relay; and
   inputting a remote signal representative of the current sensed by the remote relay into said interface and via at least two mutually opposed primary windings of the transformer to the local relay such that no current is induced in the secondary windings of the transformer, thereby preventing feedback.

* * * * *